United States Patent
Nawaz

(10) Patent No.: US 10,589,255 B1
(45) Date of Patent: Mar. 17, 2020

(54) TANTALUM VANADATE NANORODS AND METHODS OF THEIR MAKE AND USE

(71) Applicant: Imam Abdulrahman Bin Faisal University, Dammam (SA)

(72) Inventor: Muhammad Nawaz, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 16/157,153

(22) Filed: Oct. 11, 2018

(51) Int. Cl.
| | | |
|---|---|---|
| *B01J 23/22* | (2006.01) | |
| *B01J 35/00* | (2006.01) | |
| *B01J 35/10* | (2006.01) | |
| *C01G 35/00* | (2006.01) | |

(52) U.S. Cl.
CPC ............ *B01J 23/22* (2013.01); *B01J 35/004* (2013.01); *B01J 35/0013* (2013.01); *B01J 35/0033* (2013.01); *B01J 35/1014* (2013.01); *B01J 35/1038* (2013.01); *B01J 35/1061* (2013.01); *C01G 35/00* (2013.01); *C01P 2002/72* (2013.01); *C01P 2002/84* (2013.01); *C01P 2002/85* (2013.01); *C01P 2004/03* (2013.01); *C01P 2004/16* (2013.01); *C01P 2004/54* (2013.01); *C01P 2006/12* (2013.01); *C01P 2006/14* (2013.01); *C01P 2006/16* (2013.01); *C01P 2006/40* (2013.01)

(58) Field of Classification Search
CPC .... B01J 23/22; B01J 35/1014; B01J 35/0033; B01J 35/0013; B01J 35/004; B01J 35/1061; B01J 35/1038; C01G 35/00; C01P 2002/72; C01P 2004/16; C01P 2006/16; C01P 2004/54; C01P 2006/12; C01P 2004/03; C01P 2006/14; C01P 2002/84; C01P 2002/85; C01P 2006/40
See application file for complete search history.

(56) References Cited

U.S. PATENT DOCUMENTS

| | | |
|---|---|---|
| 2013/0105852 A1 | 5/2013 | Lou et al. |
| 2015/0147038 A1 | 5/2015 | Asai et al. |

FOREIGN PATENT DOCUMENTS

| | | |
|---|---|---|
| CN | 101746827 A | 6/2010 |
| WO | 99/00524 | 1/1999 |
| WO | 2015/146830 A1 | 1/2015 |

OTHER PUBLICATIONS

Wang, Jinrui, et al. "Coprecipitation synthesis and negative thermal expansion of NbVO 5." Dalton Transactions 40.13 (2011): 3394-3397.*
Paidi, et al.; Syntheses and Characterization of AM2V2O11 (A=Ba, Sr, Pb; M=Nb, Ta) Vanadates with Centrosymmetric and Noncentrosymmetric Structures; Inorganic Chemistry, 2017, 56 (20); pp. 12631-12640; Oct. 2, 2017; Abstract.

(Continued)

*Primary Examiner* — Richard M Rump
(74) *Attorney, Agent, or Firm* — Oblon, McClelland, Maier & Neustadt, L.L.P.

(57) ABSTRACT

Tantalum vanadate ($TaVO_5$) forms into nanostructures, particularly nanorods, which may range in length between 100 and 600 nm with a length:width ratio between 20:1 to 50:1, and, as a bulk material, have a bandgap of 1.5 to 3.00 eV. Such nanostructures may be prepared by the hydrothermal method.

20 Claims, 8 Drawing Sheets

(56) References Cited

OTHER PUBLICATIONS

Resasco, et al; TiO2/BiVO4 Nanowire Heterostructure Photoanodes Based on Type II Band Alignment; ACS Central Science 2 (2); pp. 80-88; Feb. 3, 2016, Abstract.

Gaultois, et al.; A Recommendation engine for suggesting unexpected thermoelectric chemistries; Jan. 5, 2016; 8 pages.

Habibi, et al.; Phase stability and hot corrosion behavior of ZrO—Ta O compound in Na SO—V O mixtures at elevated Temperatures; ScienceDirect; Ceramics International vol. 40, Issue 3; pp. 4077-4083; Apr. 2014; Abstract.

Habibi, et al.; An investigation on hot corrosion behavior of YSZ-Ta O in Na SO+V O salt at 1100° C.; ScienceDirect; Corrosion Science vol. 75; pp. 409-414; Oct. 2013; Abstract.

Salke, et al.; Raman spectroscopic studies on TaVO 5; AIP Conference Proceedings vol. 1512, Issue 1; Feb. 6, 2013; Abstract.

Wang, et al; Phase Transformation and Negative Thermal Expansion in TaVO5; Inorganic Chemistry, 50 (6); pp. 2685-2690; Feb. 21, 2011; Abstract.

Nahm; Microstructure and electrical characteristics of MnTa-doped ZnO—V2 O5—ceramics with sintering; ScienceDirect; Journal of Alloys and Compunds, vol. 505 Issue 2; pp. 657-660; Sep. 2010; Abstract.

Khabibulin, et al; Solid state NMR characterization of individual compounds and solid solutions formed in Sc O V O Nb O Ta O system; Magnetic Resonance in Chemistry, vol. 45, Issue 11; Oct. 8, 2018; Abstract.

Bayot, et al; Nb—Ta, Nb—Ta—V, and Nb—Ta—Bi Oxides Prepared from Molecular Precursors Based on EDTA; Chemistry of Materials, 16 (25); pp. 5401-5407; Nov. 9, 2004; Abstract.

Skibsted, et al; 51V Chemical Shielding and Quadrupole Coupling in Ortho- and Metavanadates from 51V MAS NMR Spectroscopy; Inorganic Chemistry, 37 (12); pp. 3083-3092; May 21, 2998; Abstract.

Amarilla, et al.; MVO5(M=Nb,Ta) mixed oxides: sol-gel synthesis, structural and thermal characterization and electrochemical Li+insertion; Journal of Materials Chemistry, Issue 6; 1996; Abstract.

Ponce, et al.; Electron transfer in the H-bronzes of MVO (M Nb,Ta); ScienceDirect; Solid State Ionics, vol. 84, Issues 3-4; pp. 213-217; Apr. 1996; Abstract.

Acroya, et al; Preparation of V M O (M=Nb, Ta; 1>-a>-0.2) with different oxygen contents; Journal of thermal Analysis, vol. 40, Issue 3; pp. 1103-1108; Feb. 26, 2014; Abstract.

Amarilla, et al; Lithium-niobium vanadium oxide and lithium-tantalum vanadium oxide, MVO5, bronzes; Chemistry of Materials, 4 (1); pp. 62-67; Jan. 1992; Abstract.

Yamaguchi, et al; Preparation of Alkoxy-Derived Tantalum Vanadate; Journal of the American Ceramic Society, vol. 72, Issue 10; Oct. 1989; Abstract.

Chahboun, et al; TaVO, a novel derivative of the series of monophosphate tungsten bronzes (PO ) (WO )2m; ScienceDirect; Materials Research Buletin, vol. 23, Issue 6; pp. 805-812; Jun. 1988; Abstract.

Chu, et al; The Coefficients of Thermal Expansion of La2O3, TaVO5 and Ta16W18O94 Below Room Temperature; Journal of Engineering Materials and Technology, 108 (3); pp. 275-277; Sep. 15, 2009; Abstract.

\* cited by examiner

TANTALUM VANADATE NANORODS AND METHODS OF THEIR MAKE AND USE

BACKGROUND OF THE INVENTION

Field of the Invention

This application relates to tantalum vanadate materials, particularly nanorods of tantalum vanadate, and methods of making nanostructured tantalum vanadate materials.

Description of the Related Art

Vanadates have been known for having colorful aqueous solutions according to oxidation state of the vanadium, and certain redox batteries have taken advantage of vanadium's multiple oxidation states. Vanadium has been used in alloys of steel for decades, imparting wear resistance and hardness, as well as in alloys of titanium or aluminum, functioning to increase strength and temperature stability. Vanadium is also known in fungal and animal enzymes, deficiencies of vanadium even being associated with stunted growth in rats. Vanadium is considered an essential nutrient for humans by the U.S. Institute of Medicine.

Tantalum is a rare, hard, blue-gray, lustrous transition metal that is corrosion-resistant and refractory. Tantalum is relatively chemically inert, and thus useful, e.g., as a substitute for platinum, or in tantalum capacitors in electronic equipment such as mobile phones, DVD players, video game systems and computers. Tantalum is found together in minerals with niobium, and often a component of inorganic compounds with, or substituting for niobium. Tantalum is also used in several alloys for its high melting point, strength, and ductility. Due to tantalum's high density, high melting point, and inertness, its alloys are used in carbide tools for metalworking equipment, jet engine components, chemical process equipment, nuclear reactors, vacuum furnaces, thermowells, valve bodies, fasteners, and the like.

To date, however, vanadates, particularly tantalum vanadates, having not been made into nanostructures, such as nanorods, nor has any method been disclosed for making such $TaVO_5$ nanostructures or their subsequent uses.

Hydrothermal synthesis includes the various techniques of crystallizing substances from high-temperature aqueous solutions at high vapor pressures; also termed "hydrothermal method." Hydrothermal synthesis can be defined as a method of synthesis of single crystals that depends on the solubility of minerals in hot water under high pressure. The crystal growth can be performed in an apparatus comprising a steel pressure vessel, such as an autoclave, in which a nutrient/mineral is supplied along with water. A temperature gradient is generally maintained between the opposite ends of the growth chamber. Under a gradient, at the hotter end the nutrient solute dissolves, while at the cooler end it is deposited on a seed crystal, growing the desired crystal. An autoclave is typically a thick-walled, steel cylinder having a hermetic seal capable of withstanding high temperatures and/or pressures for prolonged periods of time. The autoclave material is preferably inert to the solvent and materials crystallization. The autoclave closure is an important element of the autoclave, i.e., seals such as a Bridgman seal. Steel-corroding solutions are often used in hydrothermal experiments, but protecting inserts, e.g., PTFE, may be used to prevent corrosion of the internal cavity of the autoclave.

The hydrothermal method may offer advantages over other types of crystal growth including the ability to create crystalline phases not stable at the melting point. Also, materials having a high vapor pressure near their melting points can be grown by the hydrothermal method. The hydrothermal method is also particularly suitable for the growth of large good-quality crystals while maintaining control over their composition. Disadvantages of the hydrothermal method include the need for expensive autoclaves, and the impossibility of, or difficulty in, observing crystal growth.

Many inorganic compounds have been synthesized under hydrothermal conditions, including elements, simple oxides, complex oxides, tungstates, molybdates, carbonates, silicates, germanates, etc. Hydrothermal synthesis is commonly used to grow synthetic quartz, gems and other single crystals with commercial value. Some of the crystals that have been efficiently grown are emeralds, rubies, quartz, alexandrite and others. The hydrothermal method has proven efficient for certain new compounds with specific physical properties and in the systematic physicochemical investigation of intricate multicomponent systems at elevated temperatures and pressures, but no synthesis of tantalum vanadate nanostructures, such as nanorods, by the hydrothermal method or otherwise, has been reported to date.

WO 2015/146830 A1 by Yoshino, et al., discloses a photocatalyst which is capable of achieving a greatly improved catalytic efficiency by surface plasmon resonance. Yoshino's photocatalyst is composed of metal oxide particles which have a photocatalytic action and support metal particles having absorption by means of surface plasmon resonance, and particles which contain one or more metal elements selected from copper, palladium, and platinum. Its metal oxide particles preferably contain one or more substances selected from the group consisting of titanium oxide, tungsten oxide, vanadium oxide, zinc oxide, tin oxide, indium oxide, bismuth oxide, bismuth tungstate, bismuth vanadate, strontium titanate and tantalum oxynitride. The metal particles preferably contain one or more metal elements selected from among gold and silver.

While Yoshino separately discloses vanadate, i.e., vanadium oxide and bismuth vanadate, and tantalum, i.e., tantalum nitride, oxide, or oxynitride, Yoshina does not disclose these components together, nor as nanorods. Yoshino indicates that its metal oxide particles may be commercially available or prepared using known techniques, such as sputtering, vapor deposition, a vapor phase method such as CVD, a hydrothermal synthesis method, sol-gel method, micelle, reverse micelle method, microwave heating, liquid-phase method. Moreover, Yoshino requires one or two of copper, palladium, or platinum.

US 2015/0147038 A1 by Asai, et al., discloses an optical waveguide device includes a thin layer of an optical material, e.g., lithium niobate, lithium tantalate, lithium niobate-lithium tantalate, yttrium aluminum garnet, yttrium vanadate, gadolinium vanadate, potassium gadolinium tungstate, or potassium yttrium tungstate, and a ridge portion of tantalum pentoxide, having a trapezoidal perpendicular cross section, loaded on the thin layer.

While Asai discloses tantalates, such as lithium tantalate and tantalum pentoxide, and vanadates, such as gadolinium and yttrium vanadate, Asai fails to disclose $TaVO_5$, much less a nanostructure or nanorod of $TaVO_5$.

US 2013/0105852 A1 by Lou, et al., discloses a package structure and a method for making it. Lou's package structure includes a chip, a substrate, and an adhesive layer. Lou's chip includes an electrode portion, and the substrate includes a circuit portion. Lou's adhesive layer is disposed between the electrode and circuit portions to form an electrical connection. Lou's adhesive layer comprises a metal compound with a negative coefficient of thermal expansion (negative CTE), such as $ZrW_2O_8$, $PbTiO_3$, $BaTiO_3$, $ZrV_2O_7$, $TaVO_5$, $LiAlSiO_4$ (β-eucryptite), and/or AgI.

While Lou may describe that its metal compound material may be $ZrV_2O_7$ or $TaVO_5$, Lou fails to describe any nanostructured tantalum vanadate, nor any method of making $TaVO_5$ nanostructures, particularly failing to disclose $TaVO_5$ nanorods.

CN 101746827 A by Jun, et al., discloses a negative thermal expansion material of $TaVO_5$, synthesized by mixing pure $V_2O_5$ and $Ta_2O_5$ in a mol ratio between 0.52:0.48 and 0.6:0.4 and in a solid phase method. A method for preparing the negative thermal expansion material $TaVO_5$ involves: selecting synthesized pure $V_2O_5$ and $Ta_2O_5$ as raw materials; mixing the $V_2O_5$ and the $Ta_2O_5$ in the mol ratio; performing ball milling on the mixture in solution of ethanol for 1 to 24 hours to fully mix the mixture with the solution of the ethanol; drying the obtained powder and then keeping the temperature between 750 and 850° C. for 2 to 10 hours; reducing the temperature to cool the powder, then pressing the powder into tablets, and keeping the temperature between 750 and 850° C. for 10 to 48 hours; and cooling the tablets to obtain pure $TaVO_5$ with negative thermal expansion performance, wherein in a temperature range of between room temperature and 800° C., the expansion coefficient of an intrinsic body is $-1.22 \cdot 10^{-5}$; and in a temperature range of between room temperature and 600° C., the expansion coefficient (alpha) is equal to $-3.72 \cdot 10^{-6}$ While Jun describes $TaVO_5$, Jun does not mention nanostructures of $TaVO_5$, and is particularly silent on nanorods. Jun synthesizes its $TaVO_5$ by a solid state method involving milling and mixing $Ta_2O_5$ and $V_2O_5$, stirring the mixture in ethanol, then heating at 750° C., then cooling down and compressing into tablets.

WO 1999/000524 A1 by Holzer, et al., discloses techniques for forming composites including $XW_2O_8$, where X=Zr, Hf, or a combination, dispersed within a continuous, metal matrix. A low to zero coefficient of thermal expansion material, with high thermal and electrical conductivity, results. One method for forming the composite involves coating particles of $XW_2O_8$ with a layer of metal, then isostatically pressing the particles under conditions amenable to formation of a composite. Holzer's technique of coating, with a more malleable phase, a phase that undergoes a disadvantageous phase transformation of decomposition upon exposure to a threshold pressure at a set temperature can be applied to a variety of materials.

While Holzer may mention negative CTE materials to include $ZrV_2O_7$, $ZrVP_2O_7$, $TaVO_5$, $TaVO_5$—$WO_3$, and composites of $Ta_{16}W_{18}O_{94}$ and Super Invar powders, Holzer fails to disclose any regular structure to these materials, other than compacted coated particles.

Li, et al., in *Metal Oxide Nanostructures and Their Applications* 2010, 4, 55-98 (Eds. Umar, A.; Hahn, Y.-B. American Scientific Publishers, ISBN: 1-58883-170-1), discloses nanostructured $TiO_2$ based photocatalysts, including porous $TiO_2$, ion-doped $TiO_2$, and surface-modified $TiO_2$ nanomaterials. Also, development of novel non-$TiO_2$-based metal oxide photocatalysts is discussed including transition metal oxides, titanates, vanadates, niobates, tantalates, molybdates, tungstates, p-block metal oxides and hydroxides, and heterojunction semiconductor photocatalysts.

While Li may disclose vanadates and tantalates, Li requires $TiO_2$ and fails to clearly disclose combining Ta and V, at least without Ti, much less forming a nanorod from $TaVO_5$.

Amarillo, et al. in *J. Materials Chem.* 1996, 6(6), 1005-1011, discloses preparation, via the sol-gel techniques, of $MVO_5$ (M=Nb, Ta) oxides. Amarillo describes that the sol-gel method is the only procedure for producing $NbVO_5$ as a pure phase, and presents results concerning the influences of different parameters on the nature of the final products in the V—Nb—O system. Compounds $NbVO_5$ and $TaVO_5$ have orthorhombic unit cells, but the crystallization and decomposition temperatures of $NbVO_5$ are lower than $TaVO_5$. Amarillo also investigates electrochemical insertion of lithium ions into the new $MVO_5$ (M=Nb, Ta) mixed oxides, which, for both materials, is complex and includes three main steps. The maximum insertion degrees (x in $Li_xMVO_5$) achieved after the reduction process are x=1.95 for $NbVO_5$ and x=1.57 for $TaVO_5$. Amarillo's galvanostatic cycling studies show the good rechargeability of the $Li^+/e^-$ insertion/deinsertion process in the $MVO_5$ oxides.

While Amarillo may describe $TaVO_5$, Amarillo fails to disclose nanostructures and/or nanorods of $TaVO_5$, and instead uses the materials for impregnation with Li and use in batteries. Furthermore, Amarillo uses the sol-gel method, i.e., condensation of alkoxides to form a solid network, rather than the hydrothermal method.

Casais et al. in *J. Thermal Analysis* 1993, 40, 1103, describes thermal behavior of oxides of pentavalent V and Nb or Ta in different dynamic hydrogen atmospheres. Casais states that previous studies of the phases obtained by heating mixtures of $V_2O_5$ and $M_2O_5$ (M=Nb, Ta) in air lead to (i) preparation of $VTaO_5$ from both oxides for the first time, (ii) proof of the existence of the solid-solutions $VM_mO_{5/2(m+1)}$, and (iii) proof that the materials described as $NbVO_5$ and β-$TaVO_5$ are really mixtures of $VM_9O_{25}$ and $V_2O_5$. Casais describes that reduction of $VMO_5$ gives monophasic rutile-type $VMO_4$ from 650° C., and that reduction of $VM_2O_{7.5}$, $V_3M_{17}O_{50}$, and $VM_9O_{25}$ at 1,000° C. leads to monophase non-stoichiometric $V_aM_{2-a}O_y$ only for M=Nb.

While Casais appears to teach heating $V_2O_5$ and $Nb_2O_5$ or $Ta_2O_5$, seeking to understand the composition of products of this reaction, Casais indicates that tantalates, rather than vanadates, are formed in known processes. Casais appears to only describe reducing vanadium tantalates at high temperature, but fails to disclose producing $TaVO_5$, much less any morphology or nanostructure, particularly nanorods, nor which method should be used to make such tantalum vanadates.

Yamaguchi et al. in *J. Am. Ceramic Soc.* 1989, 72(10), 1914-17, discloses compound formation in the system $Ta_2O_5$—$V_2O_5$ using amorphous materials prepared by the simultaneous hydrolysis of tantalum and vanadyl alkoxides. Three compounds exist in this system: $9Ta_2O_5 \cdot V_2O_5$, $9Ta_2O_5 \cdot 2V_2O_5$, and $Ta_2O_5 \cdot V_2O_5(TaVO_5)$. Solid solutions of δ-$Ta_2O_5$ are formed at low temperatures up to 10 mol % $V_2O_5$. They transform to β-$Ta_2O_5$ solid solutions at higher temperatures; the transformation temperature falls with increasing $V_2O_5$ A new compound, $9Ta_2O_5 \cdot V_2O_5$, 670° to 755°. It has an orthorhombic unit cell with a=0.7859 nm, b=1.733 nm, and c=1.766 nm. Orthorhombic $TaVO_5$ crystallized at 535° to 560° decomposes into $9Ta_2O_5 \cdot V_2O_5$ at 1010°.

Yamaguchi therefore discloses tantalate vanadates, and fails to disclose $TaVO_5$, or a morphology of $TaVO_5$, much less $TaVO_5$ nanorods or how such nanorods could be formed.

Chahboun et al. in *Mat. Res. Bull.* 1988, 23(6), 805-812, discloses synthesizing orthovanadate $TaVO_5$ in soft thermal conditions using $H_4OTa_2O_6$ as source of $Ta_2O_5$ and studies the same by electron diffraction, X-ray diffraction and infrared spectroscopy. Chahboun states that TaVO$_5$ crystallizes in the orthorhombic system with a=11.860(3), b=5.516(1), c=6.928(1) Å and Z=4 in space group Pnma. Chahboun states that x-ray powder data shows that TaVO$_5$'s structure is isostructural with β-NbPO$_5$ and related compounds β-TaPO$_5$, TaAsO$_5$ and WPO$_5$, which can be considered as second members of the series of the monophosphate tungsten bronzes (PO$_2$)$_4$(WO$_3$)$_{211}$, with pentagonal tunnels. According to Chahboun, compared to β-TaPO$_5$, TaVO$_5$ exhibits a less distorted framework which involves a better ability of VO$_4$ tetrahedra to be connected with TaO$_6$ octahedra.

Accordingly, Chahboun discloses synthesizing TaVO$_5$ and studies its crystal structure, but fails to disclose forming nanorods of TaVO$_5$, nor forming these using the hydrothermal method.

Brown et al. in *Transactions of the British Ceramic Society* 1965, 64(9), 419-37, discloses ternary equilibrium reactions of ZnO with SiO$_2$, GeO$_2$, P$_2$O$_5$, V$_2$O$_5$, Nb$_2$O$_5$, and Ta$_2$O$_5$. Compatibility relations and solid solution formations were established for 15 ternary systems. Brown reports new compounds, Zn$_2$Nb$_4$P$_2$O$_{17}$, VPO$_5$, NbVO$_5$, and TaVO$_5$.

While Brown purports to disclose forming TaVO$_5$, Brown fails to disclose a nanostructure, esp. a nanorod, of TaVO$_5$, nor forming such a TaVO$_5$ nanorod by a hydrothermal method.

Therefore, a need still exists for nanostructured forms of TaVO$_5$, particularly nanorods, as well as methods for making such TaVO$_5$ nanostructures.

SUMMARY OF THE INVENTION

Aspects of the invention may provide compositions comprising: a plurality of nanorods, wherein at least 75 wt. % of a total weight of the nanorods is tantalum vanadate (TaVO$_5$). Any of the features discussed herein as tolerable for the invention may be combined in any permutation unless specifically described otherwise.

The plurality of nanorods may have an average length in a range of from 100 to 600 nm.

Inventive compositions may have a bandgap in a range of from 1.5 to 3.00 eV.

The plurality of nanorods may have an average length:width ratio in a range of from 20:1 to 50:1.

The plurality of nanorods may have a BET surface area in a range of from 40 to 100 m$^2$/g.

The plurality of nanorods may have an average pore volume in a range of from 0.170 to 0.210 cm$^3$/g.

The plurality of nanorods may have an average pore size in a range of from 8 to 15 nm.

Composition may comprise at least 90 wt. % of the plurality, relative to a total composition weight and may even consist essentially of the plurality.

Aspects of the invention may provide nanorod(s) comprising TaVO$_5$ in at least 75 wt. % of total nanorod weight.

Nanorods of the invention may comprise at least 90 wt. % of TaVO$_5$, relative to the total nanorod weight.

Nanorods of the invention may have an energy-dispersive x-ray spectroscopy pattern including a predominant peak in a range of from 4.7 to 5.1 KeV, having a first intensity, a secondary peak in a range of from 1.5 to 1.9 KeV, having a second intensity, and a tertiary peak in a range of from 0.3 to 0.6, having a third intensity, the intensities being integrals of areas under respective peaks, wherein the first intensity is in a range of from 3 to 6-fold that of the third intensity, and wherein the first intensity is in a range of from 2 to 3-fold that of the second intensity.

Aspects of the invention may provide photocatalyst(s) and/or heterojunction(s) comprising one or more of any nanorod within the scope of the invention.

Aspects of the invention may provide methods of preparing a TaVO$_5$ nanorod, comprising: heating, at a temperature in a range of from 150 to 300° C., for a time period in a range of from 5 to 72 hours, a mixture comprising a metavanadate, an acid, and a soluble tantalum compound, wherein the acid comprises formic acid, acetic acid, glycolic acid, propionic acid, butyric acid, citric acid, methanesulfonic acid, oxalic acid, malic acid, glutaric acid, maleic acid, fumaric acid, phenol, benzoic acid, salicylic acid, tartaric acid, and/or wherein the acid and the metavanadate comprise H$_3$VO$_4$.

The metavanadate of inventive methods may comprise ammonium metavanadate (NH$_4$VO$_3$), and/or the acid may comprise formic acid (HCOOH), and/or the soluble tantalum compound may comprise a tantalum halide, particularly tantalum pentachloride (TaCl$_5$).

Inventive methods may implement reaction time periods in a range of from 12 to 36 hours, and/or a temperature in a range of from 170 to 220° C.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
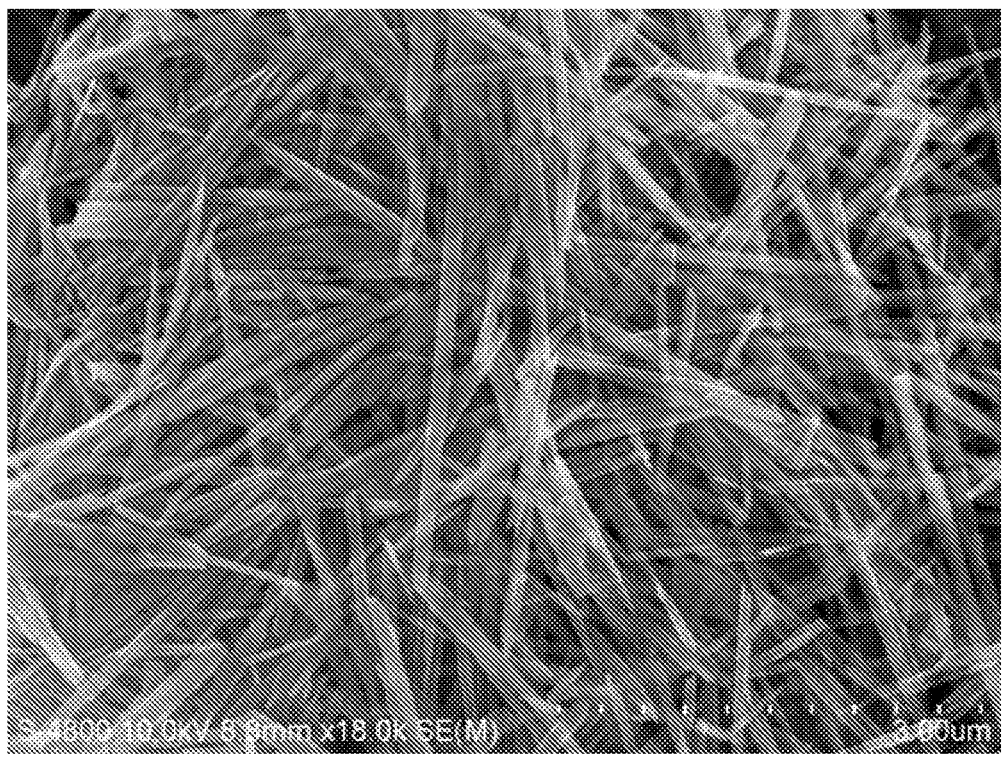
FIG. 1A to D show scanning electron microscope (SEM) images of TaVO$_5$ as synthesized within the scope of the invention using formic acid at various zooms.

Aspects of the invention may provide compositions comprising: a plurality of nanorods, wherein at least 75, 80, 85, 90, 91, 92, 92.5, 93, 94, 95, 96, 97, 97.5, 98, 99, 99.1, 99.5, or 99.9 wt. % of a total weight of the nanorods is tantalum vanadate (TaVO$_5$). Inventive compositions may comprise at least 75, 80, 85, 90, 92.5, 95, 97.5, 98, 99, 99.1, 99.5, or 99.9 wt. % of the plurality of nanorods, relative to a total composition weight. Inventive compositions may consist essentially of the plurality of nanorods, meaning that for certain applications compositions will limit further contents to those which do not diminish the bandgap to less than 75, 85, or 90% of 1.5 eV, and/or that such further components do not cause to nanorods to lose more than 50, 75, or even 90% of the catalytic efficiency of pure TaVO$_5$-comprising nanorods, and/or that such further components cause a loss of the nanorod morphology.

Inventive compositions generally have a bandgap in a range of from 1.5 to 3.00, 1.6 to 2.8, 1.7 to 2.6, 1.8 to 2.5, 1.9 to 2.4, 2.0 to 2.3, or 2.1 to 2.2 eV. Upper and lower bandgap endpoints may be any of the prior values or may be at least 1.55, 1.65, 1.75, 1.85, 1.95, 2.05, or 2.15 eV, and/or no more than 3.05, 2.9, 2.75, 2.7, 2.55, 2.45, 2.33, or 2.25 eV.

The plurality of nanorods may have an average length in a range of from 50 to 1000, 100 to 600, 150 to 550, 200, to 500, 275 to 375, 250 to 350, or 300 to 400 nm. The plurality of nanorods may have an average length:width (L:W) ratio, which may also be considered a "length to cross-sectional diameter" ratio or "aspect ratio," in a range of from 20:1 to 50:1, 25:1 to 40:1, or 30:1 to 40:1. The average L:W ratio of inventive rods may be any of these ratios or at least 15:1, 17.5:1, 22.5:1, 27.5:1, or 32.5:1, and/or no more than 100:1, 75:1, 60:1, 45:1, 40:1, or 35:1. The nanostructures, e.g., nanorods, may have a cylindrical, square, hexagonal, and/or octagonal prismic structure, e.g., with a circular, ovular, square (non-square rectangular), rhombic, trapezoidal, triangular, pentagonal, hexagonal, and/or octagonal cross-section, orthogonal to the length of extension of the nanostructure. The nanostructure may also be spherical, plate-like, and/or needle-like, i.e., with an extended conical shape, particularly wherein one end has a larger cross-section than the other. In addition to these, or separately from them, multi-pronged morphologies are also considered, such as star-shaped, propeller-shaped, cross-shaped, x-shaped, and/or fractal-shaped morphologies.

Nanorods within the scope of the invention may have a variety of lengths and diameters, though generally dimensionally under 1,000 nm. Typical average nanorod lengths may be at least 10, 25, 50, 100, 150, 200, 225, 250, 275, 300, 325, or 350 nm, and/or generally no more than 1,000, 750, 600, 550, 500, 475, 450, 425, 400, or 375 nm, in any combination. The standard deviation from the average length, which may depend upon the method of synthesis and/or the rate of crystallization, may be in a range of from 10 to 250, 25 to 200, 33 to 175, or 50 to 150 nm.

The plurality of nanorods may have a BET surface area in a range of from 40 to 100, 45 to 95, 50 to 90, 55 to 85, 60 to 80, 62.5 to 77.5, 65 to 75, 67.5 to 72.5, or 69 to 71 m$^2$/g. While not limited in theory, the BET surface area may be any of these or at least 35, 42.5, 47.5, 52.5, 57.5, 61, 62, 63, 64, 66, 67, 68, or 69 m$^2$/g, and/or no more than 92.5, 82.5, 77, 76, 75, 73, m$^2$/g. In addition or separately, the plurality of nanorods may have an average pore volume in a range of from 0.170 to 0.210, 0.175 to 0.205, 0.1775 to 0.2025, 0.180 to 0.200, 0.185 to 0.1975, 0.186 to 0.197, 0.187 to 0.196, 0.188 to 0.195, 0.189 to 0.1945, 0.190 to 0.194, 0.191 to 0.193 cm$^3$/g. While not limited in theory, the average pore volume may be any of these or at least 0.165, 0.172, 0.174, 0.176, 0.177, 0.178, 0.179, 0.1825, 0.184, 0.1875, or 0.192 cm$^3$/g, and/or no more than 0.215, 0.204, 0.203, 0.201, 0.199, 0.198, 0.1965, 0.1955, or 0.1935 cm$^3$/g. In addition or separately, the plurality of nanorods may have an average pore size in a range of from 8 to 15, 9 to 14, 10 to 13, 11 to 12 nm. While not limited in theory, the average pore volume may be any of these or at least 7.5, 8.5, 9.5, 10.5, 10.75, or 11.5 nm, and/or no more than 20, 18, 17.5, 16, 13.5, or 12.5 nm.

Inventive nanorod(s) may comprise Ta—V-oxides, particularly TaVO$_5$, in at least 50, 75, 80, 85, 90, 92.5, 95, 97.5, 98, 99, 99.5, or 99.5 wt. % of total nanorod weight. Any of these inventive nanorods may be included in one or more photocatalyst(s) and/or heterojunction(s), either alone or in combination with other components.

Methods of preparing a TaVO$_5$ nanorod, may comprise: heating a mixture comprising metavanadate and tantalum ions, preferably in solution, particularly in a hydrothermal process, at a temperature in a range of from 150 to 300, 160 to 280, 165 to 260, 170 to 240, 172.5 to 220, 175 to 210, 177.5 to 200° C. The reaction may be conducted at any of these temperatures for a time period in a range of from 5 to 72, 10 to 60, 12 to 56, 15 to 50, 16 to 48, 18 to 36, or 20 to 28 hours. Reaction time periods may be in a range of from 12 to 36, 18 to 30, or 22 to 26 hours, optionally along with a temperature in a range of from 170 to 220, 172 to 212, 174 to 202, 176 to 192, or 178 to 182° C. or at about 180° C., and will generally be conducted above 120, 135, 150, 160, or 175° C.

The reaction mixture may comprise a metavanadate, an acid, and a soluble tantalum compound. The fluidizing material, particularly a solvent, generally comprises at least 50, 75, 80, 90, 95, or 99% water, particularly distilled or deionized water, though cosolvents or alternates, such as alcohols, DMSO, DMF, acetonitrile, or ionic liquids may be used. The reaction is generally conducted in an autoclave, or some variety of a pressure reactor. The acid in the reaction may be inherent, e.g., acidified vanadate (H$_3$VO$_4$) in which case the vanadate and acid would be unified, or may comprise formic acid, acetic acid, glycolic acid, propionic acid, butyric acid, citric acid, methanesulfonic acid, oxalic acid, malic acid, glutaric acid, maleic acid, fumaric acid, phenol, benzoic acid, salicylic acid, and/or tartaric acid, particularly formic acid. The metavanadate used in inventive methods may comprise ammonium metavanadate (NH$_4$VO$_3$), and/or the acid may comprise formic acid (HCOOH), and/or the soluble tantalum compound may comprise a tantalum halide, i.e., chloride, bromide, or iodide, particularly tantalum pentachloride (TaCl$_5$). An exemplary method of preparing TaVO$_5$ nanorods within the invention may comprise heating a solution comprising ammonium metavanadate (NH$_4$VO$_3$), formic acid (HCOOH), and tantalum pentachloride (TaCl$_5$) at a temperature between 150 to 300° C. or 120 to 280° C.

Acids useful in the synthesis of nanorods according to the invention may be organic acids with molecular weights under 150, 100, 75, or 50 g/mol. Acids useful in the synthesis of nanorods according to the invention may include formic acid, acetic acid, glycolic acid, propionic acid, butyric acid, citric acid, tartaric acid, methanesulfonic acid, oxalic acid, malic acid, glutaric acid, maleic acid, fumaric acid, phenol, benzoic acid, salicylic acid, and the like. Formic acid is presently believed to be particularly useful in forming TaVO$_5$ nanorods. In certain embodiments lactic and hydrochloric acids may be used, though these have initially been seen to inhibit nanorod formation under similar synthetic circumstances. Inorganic acids, such as hydrobromic acid, hydroiodic acid, sulfuric acid, sulfurous acid, phosphoric acid, perchloric acid, chloric acid, and the like, may likewise be useful.

While they need not, the nanostructures, particularly nanorods and/or nanotubes, produced according to the invention may comprise at least 50, 60, 75, 85, 90, 92.5, 95, 97.5, 98, 99, 99.5, 99.9, 99.95, or 99.99 wt. % of a nanostructure total weight as $TaVO_5$. An aspect of the invention may provide a nanotube, comprising an oxide of Ta—V in any amount discussed herein relative to the total nanostructure mass, made by any hydrothermal method described herein, particularly using formic acid, particularly using ammonium vanadate, particularly using tantalum chloride.

The nanostructures, e.g., nanorods and/or nanotubes, may comprise no more than 15, 10, 7.5, 5, 4, 3, 2, 1, or 0.5 wt. %, relative to the total nanostructure weight, of Cu, Pd, Pt, Gd, Y, Zr, W, Hf, Ti, Zn, Mn, Mo, Nb, and/or Bi. Concretely, the nanostructures may comprise no more than 40, 33, 25, 20, 15, 10, 7.5, 5, 4, 3, 2, 1, or 0.5 wt. %, relative to the total nanostructure weight, of Cu, Pd, and Pt, and/or Gd and Y, and/or Zr, W, and Hf, and/or Ti, particularly $TiO_2$, and/or Zn, particularly ZnO, and/or Mn, and/or Mo, and/or Nb or Bi.

Put another way, relative to their total weight, the nanostructures, e.g., nanorods and/or nanotubes, may comprise no more than 15, 10, 7.5, 5, 4, 3, 2, 1, or 0.5 wt. % of Cu. Additionally or alternately, the inventive nanostructures may comprise no more than 15, 10, 7.5, 5, 4, 3, 2, 1, or 0.5 wt. % of Pd. Additionally or alternately, the inventive nanostructures may comprise no more than 15, 10, 7.5, 5, 4, 3, 2, 1, or 0.5 wt. % of Pt. Additionally or alternately, the inventive nanostructures may comprise no more than 15, 10, 7.5, 5, 4, 3, 2, 1, or 0.5 wt. % of Gd. Additionally or alternately, the inventive nanostructures may comprise no more than 15, 10, 7.5, 5, 4, 3, 2, 1, or 0.5 wt. % of Y. Additionally or alternately, the inventive nanostructures may comprise no more than 15, 10, 7.5, 5, 4, 3, 2, 1, or 0.5 wt. % of Zr. Additionally or alternately, the inventive nanostructures may comprise no more than 15, 10, 7.5, 5, 4, 3, 2, 1, or 0.5 wt. % of W. Additionally or alternately, the inventive nanostructures may comprise no more than 15, 10, 7.5, 5, 4, 3, 2, 1, or 0.5 wt. % of Hf. Additionally or alternately, the inventive nanostructures may comprise no more than 15, 10, 7.5, 5, 4, 3, 2, 1, or 0.5 wt. % of Ti, esp. $TiO_2$. Additionally or alternately, the inventive nanostructures may comprise no more than 15, 10, 7.5, 5, 4, 3, 2, 1, or 0.5 wt. % of Zn, esp. ZnO. Additionally or alternately, the inventive nanostructures may comprise no more than 15, 10, 7.5, 5, 4, 3, 2, 1, or 0.5 wt. % of Mn. Additionally or alternately, the inventive nanostructures may comprise no more than 15, 10, 7.5, 5, 4, 3, 2, 1, or 0.5 wt. % of Mo. Additionally or alternately, the inventive nanostructures may comprise no more than 15, 10, 7.5, 5, 4, 3, 2, 1, or 0.5 wt. % of Nb. Additionally or alternately, the inventive nanostructures may comprise no more than 15, 10, 7.5, 5, 4, 3, 2, 1, or 0.5 wt. % of Bi.

Inventive nanotubes or nanorods may have less than 25, 15, 10, 5, 2.5, 1, or 0.1 wt. % Li ion intercalation, though some uses may call for particularly these amounts, or more, of battery ion intercalation, such as Li, Ni—Cd, Ni-M-H, etc.

While they need not, nanostructures within the scope of the invention may comprise no more than 33, 20, 15, 10, 7.5, 5, 4, 3, 2, 1, or 0.5 wt. % of any metal besides Ta and V.

$TaVO_5$ nanostructures/nanorods within the scope of the invention, including the spherical or plate-like morphologies (and even amorphous), may have a narrow band gap useful in photocatalysis, e.g., for producing $H_2$ by splitting $H_2O$, degrading pollutants in the air and/or water, or formation for heterojunctions between other material(s) and could act as useful material to promote (photo)catalysis. Relevant pollutants which may be degraded by nanostructures according to the invention may include dyes, soaps, partially combusted hydrocarbons, oils, crude hydrocarbons, proteins, amino acids, amines, nitrogen-containing air pollutants, sulfur-containing air pollutants. As such, the TaVO5 nanostructures reported herein may be applied as coatings onto surfaces, such as canal sides or bases, roofs, building sides, stairs, ship and other watercraft surfaces and/or decks, aircraft hulls and/or wings and/or rotors. The metals of the inventive nanostructures may be provided as isotopes, such as $Ta^{180}$, to use the nanostructures in irradiation therapies.

Example 1

Preparation of $TaVO_5$ (Tantalum Vanadate) Nanorods: 0.175 g $NH_4VO_3$ (Ammonium metavanadate) was weighed and added into 25 mL of deionized water in a PTFE lined autoclave; 0.5 mL of formic acid (HCOOH) was added dropwise to this solution. After addition of 0.179 g $TaCl_5$ (Tantalum pentachloride), the mixture was stirred for 15 minutes and transferred into stainless steel autoclave, then heated at 180° C. for 24 hours. After 24 hours of reaction, the product was naturally cooled at room temperature. The cooled product was then centrifuged, washed with water and ethanol several times, and dried at 60° C. overnight. Spectroscopic and spectrometric analysis was then conducted on the product.

A field emission scanning electron microscope (Hitachi, S-4800) was used to observe the morphologies of $TaVO_5$ and to determine the elemental composition by X-ray energy-dispersive spectrometer. X-ray powder diffraction (XRD, Rigaku, Japan) analysis of $TaVO_5$ was performed with a X-ray diffractometer, using copper radiation ($\lambda$=1.5418 Å). An ultrahigh vacuum VG MultiLab 2000 X-ray photoelectron spectrometer was used to record the X-ray photoelectron spectra. A UV-Vis diffuse reflectance spectrum of the $TaVO_5$ nanorods made according to Example 1 was recorded on a diffuse reflectance UV-Vis spectrophotometer (JASCO V-750). A Micromeritics ASAP 2020 PLUS nitrogen adsorption apparatus (USA) was employed for BET surface area determination. Before analysis, samples were degassed at 180° C., and the surface area was determined by using $N_2$ adsorption data in the relative pressure (P/P0) range of 0.05 to 0.3.

The hydrothermal synthetic approach in Example 1 above, for preparing $TaVO_5$ surprisingly yielded $TaVO_5$ nanorods. The $TaVO_5$ nanorods of Example 1 had lengths of 300 to 400 nm, though reaction conditions may be modulated to obtain and vary characteristics of the nanorods of $TaVO_5$, or alternate morphologies. XRD, EDX and XPS analysis was employed to confirm the formation of $TaVO_5$. The BET surface area of $TaVO_5$ nanorods from Example 1 was observed to be 69.78 $m^2/g$, with a pore size of 11.53 nm, and a pore volume 0.192 $cm^3/g$. The band gap of the $TaVO_5$ nanorod material was found to be in a range of from 2.1 to 2.2 eV, which is an ideal band gap for visible light driven photocatalysis. Due to narrow band gap, these $TaVO_5$ nanorod can also be used as heterojunctions between other nanomaterial for photocatalysis or catalytic applications. Another potential application of $TaVO_5$ according to the invention was evaluated for photocatalytic degradation of rose bengal (4,5,6,7-tetrachloro-2',4',5',7'-tetraiodofluorescein). Results indicate that $TaVO_5$ is efficient and fast photocatalyst for the degradation for rose bengal and photocatalytic degradation was achieved within 45 minutes.

Referring now to the drawings, wherein like reference numerals designate identical or corresponding parts throughout the several views.

Figure 1B:
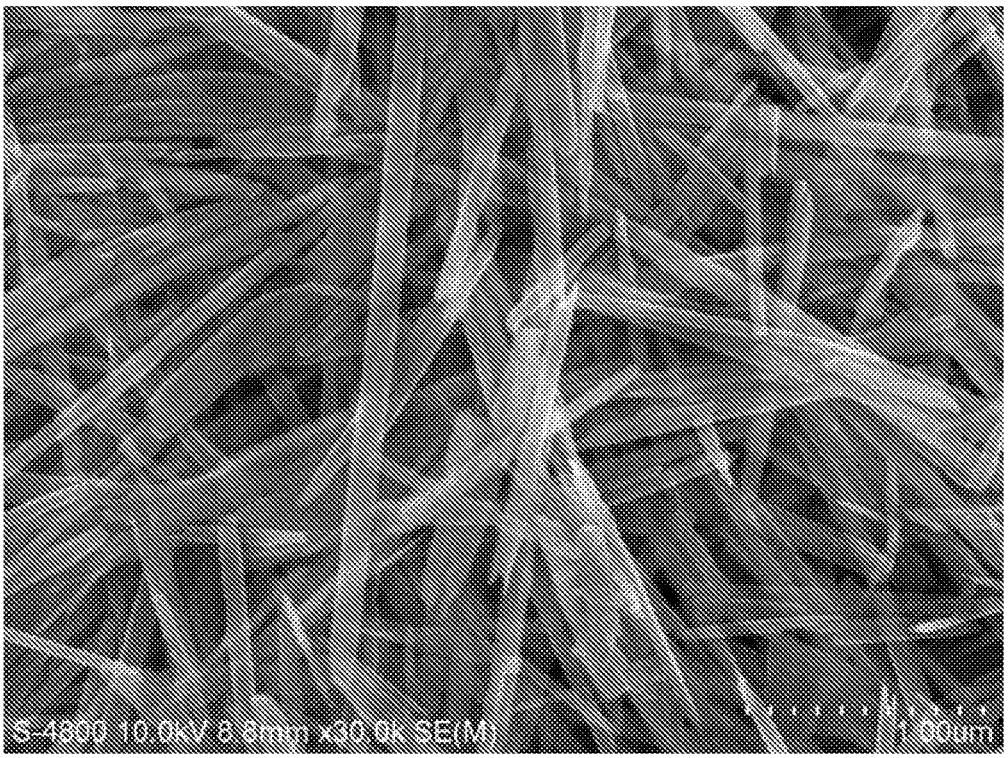
Figure 1C:
Figure 1D:
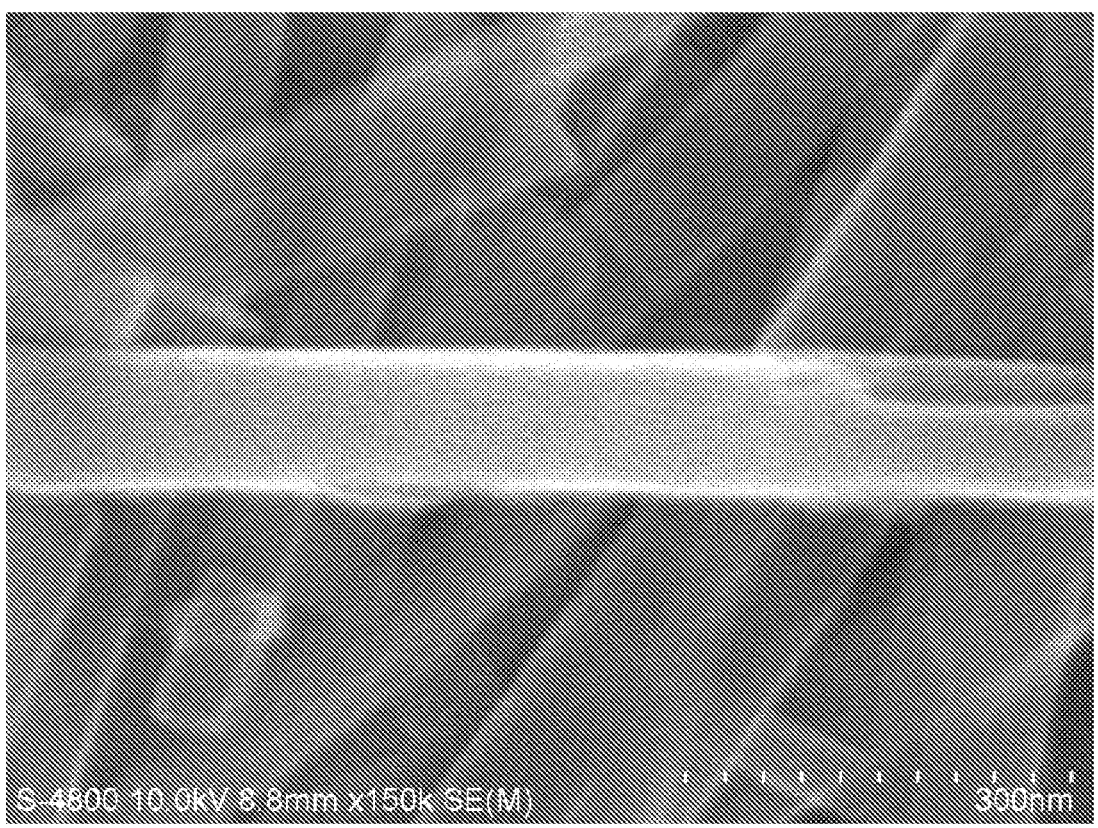
Figure 2A:
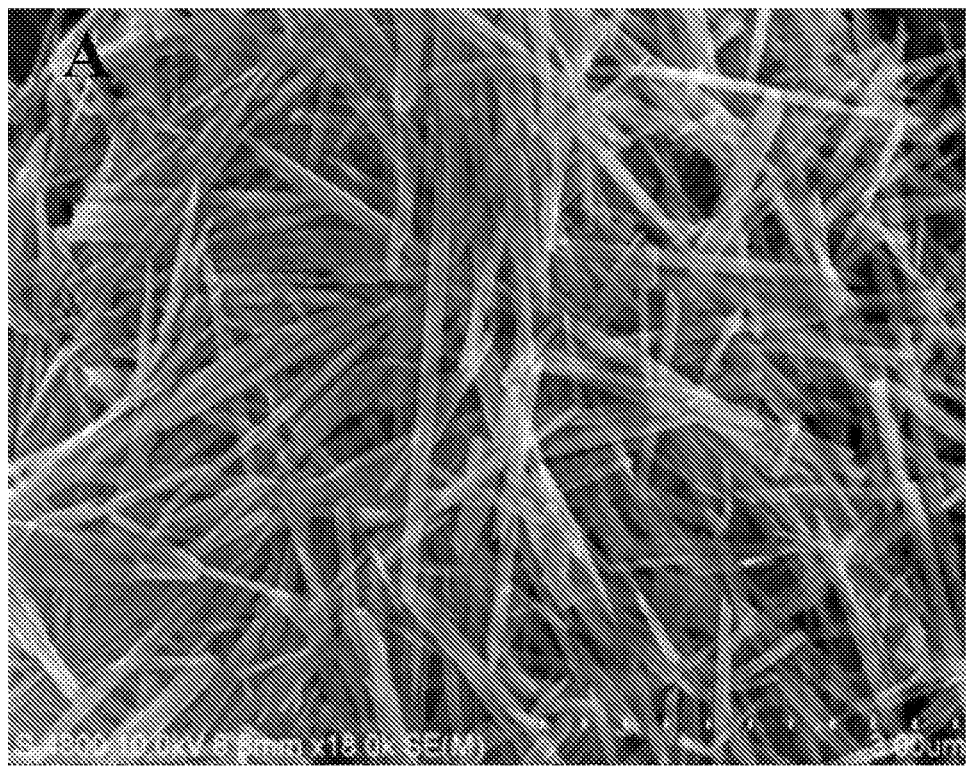
FIG. 2A shows an SEM image of TaVO$_5$ as synthesized within the scope of the invention using formic acid.
Figure 2B:
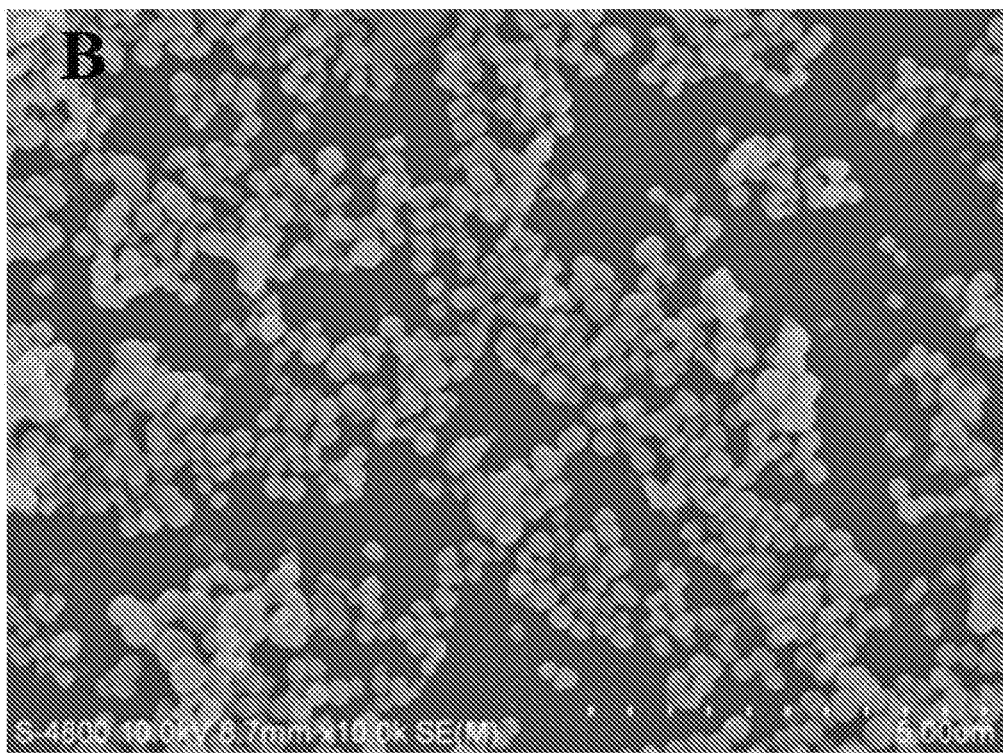
FIG. 2B shows an SEM image of TaVO$_5$ as synthesized within the scope of the invention using lactic acid.
Figure 2C:
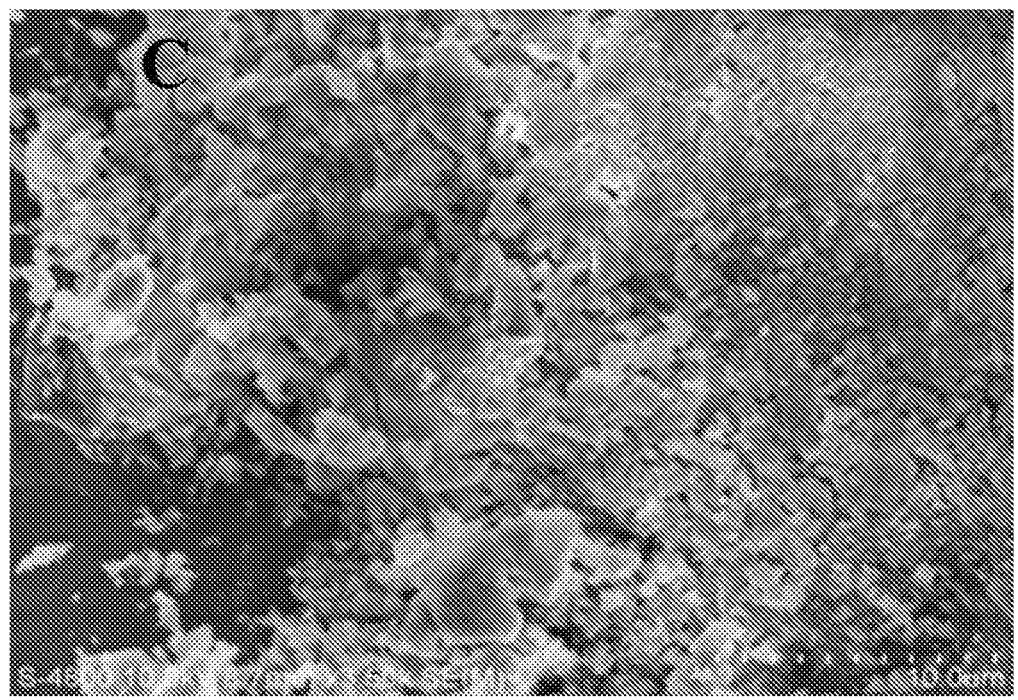
FIG. 2C shows an SEM image of TaVO$_5$ as synthesized within the scope of the invention using hydrochloric acid.

In reference to FIG. 1A to 1D, show scanning electron microscope (SEM) images of $TaVO_5$ as synthesized within the scope of the invention using formic acid at various scales, with FIG. 1A showing a 3 µm scale, FIG. 1B showing a 1 µm scale, FIG. 1C showing a 400 nm scale, and FIG. 1D showing a 300 nm scale. The nanorods illustrated in FIG. 1A to 1D illustrate morphologies arising from the synthetic method described in Example 1, using formic acid. FIG. 2A again shows the SEM image of TaVO$_5$ as synthesized within the scope of the invention using formic acid. FIG. 2B shows an SEM image of TaVO$_5$ as synthesized within the scope of the invention using lactic acid, illustrating an alternate morphology, and FIG. 2C shows the results using hydrochloric acid. The images in FIGS. 2B and 2C can be compared to the image in FIG. 2A.

Table 1 describes the relative abundance and/or relative ratio of elements such as tantalum, vanadium and oxygen in the tantalum nanorods as obtained from the EDX spectrum.

TABLE 1

| Elements | Weight % | Atomic % |
|---|---|---|
| O | 39.35 | 76.19 |
| V | 30.75 | 18.70 |
| Ta | 29.89 | 5.12 |

Figure 3:
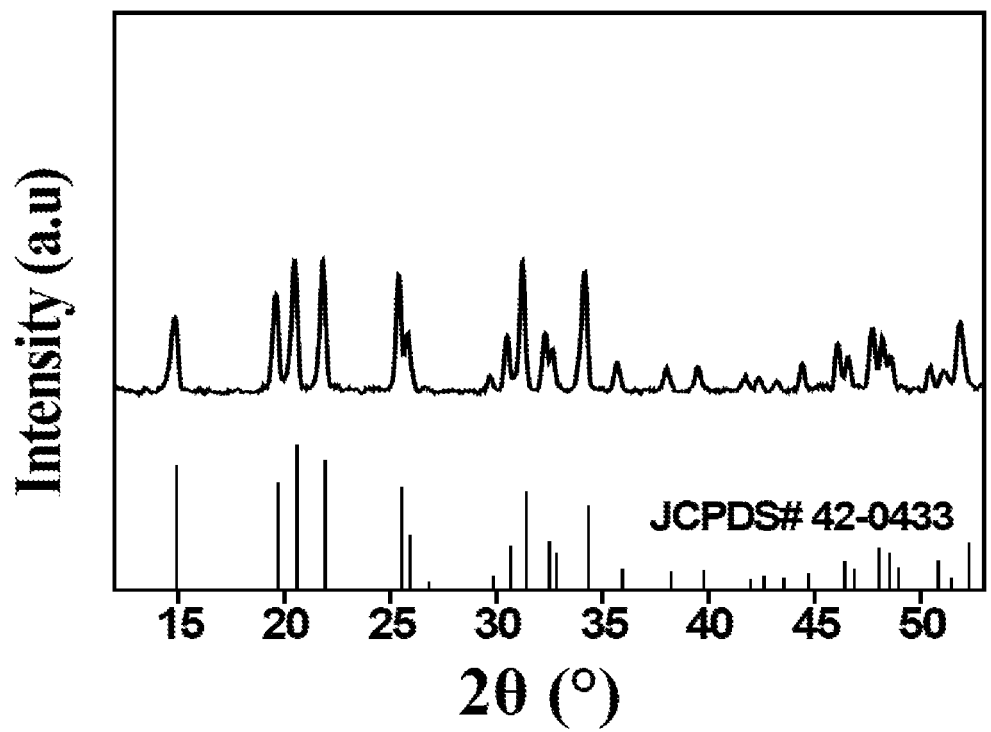
FIG. 3 shows an x-ray diffraction (XRD) pattern of TaVO$_5$ nanorods according to the invention.
Figure 4:
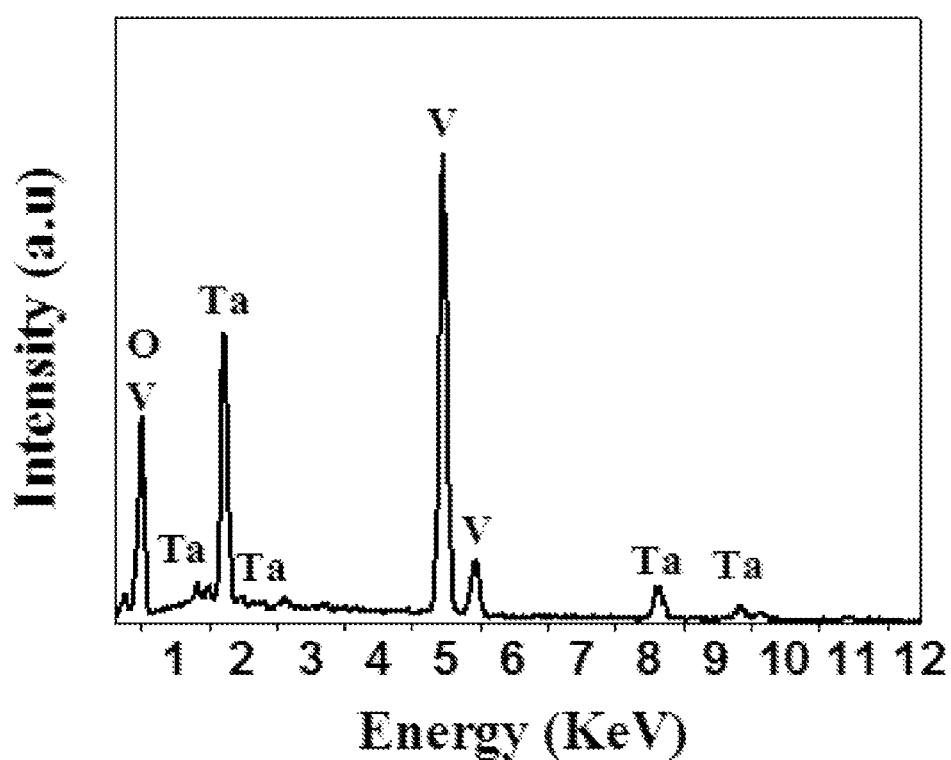
FIG. 4 shows an energy-dispersive x-ray spectroscopy (EDX or EDS) pattern of TaVO$_5$ nanorods according to the invention.
Figure 5A:
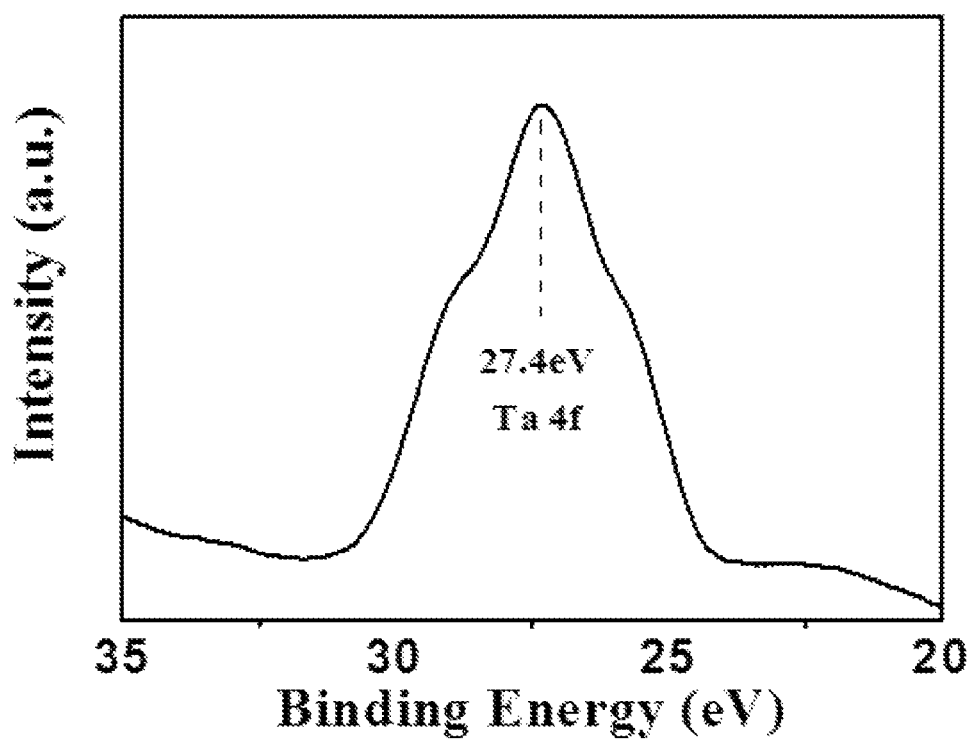
FIG. 5A to C show respective x-ray photoelectron spectroscopy (XPS) patterns of Ta, V, and O, in TaVO$_5$ nanorods according to the invention.
Figure 5B:
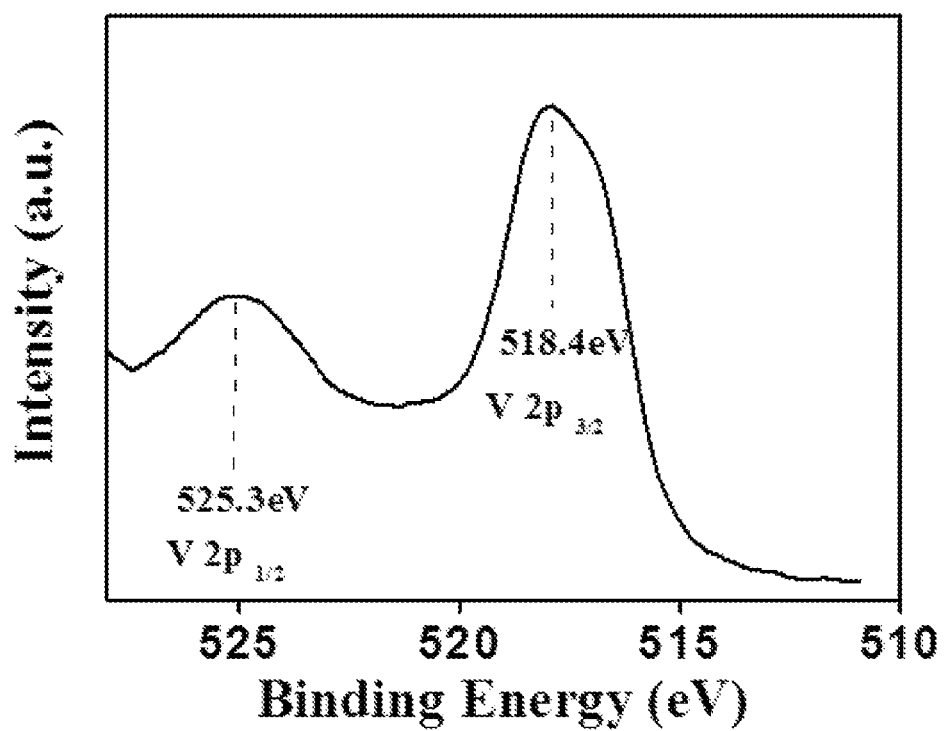
Figure 5C:
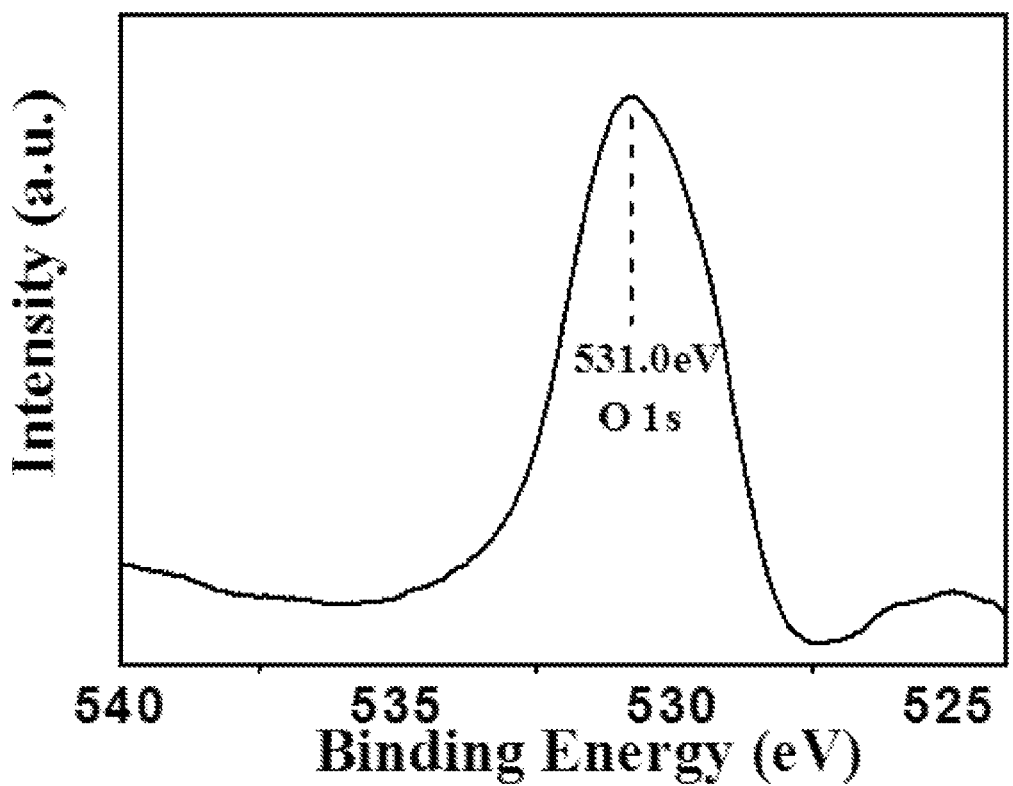
Figure 6:
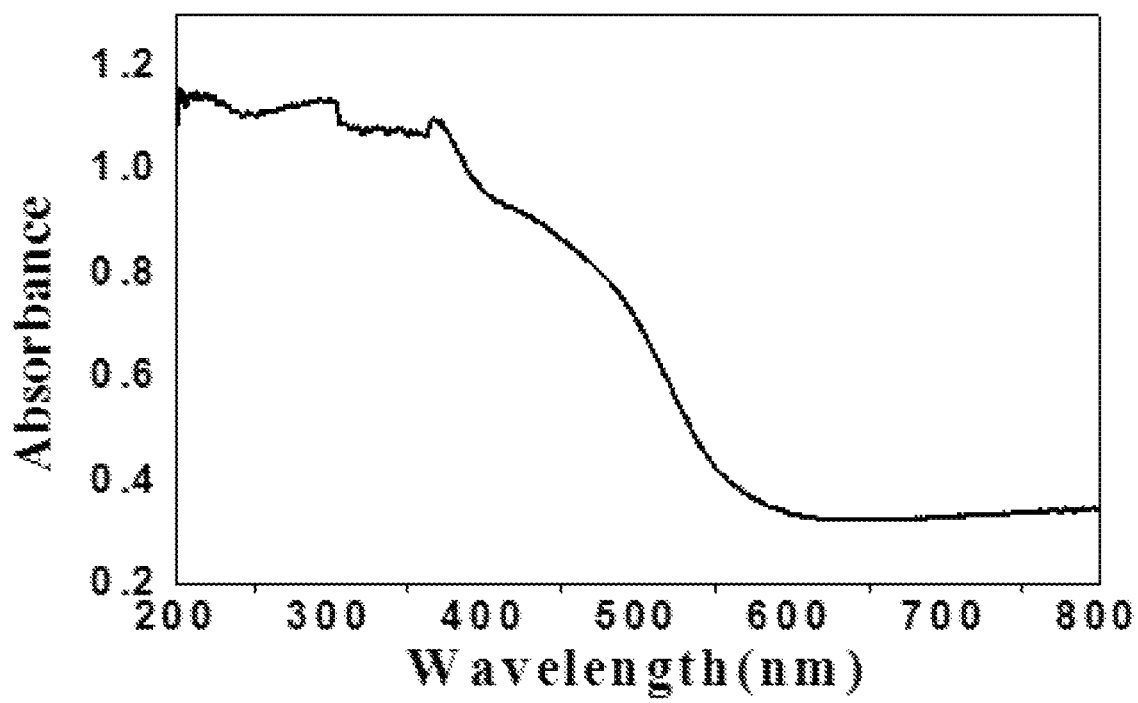
FIG. 6 shows a diffuse reflectance UV-vis spectrum of TaVO$_5$ nanorods according to the invention.
Figure 7:
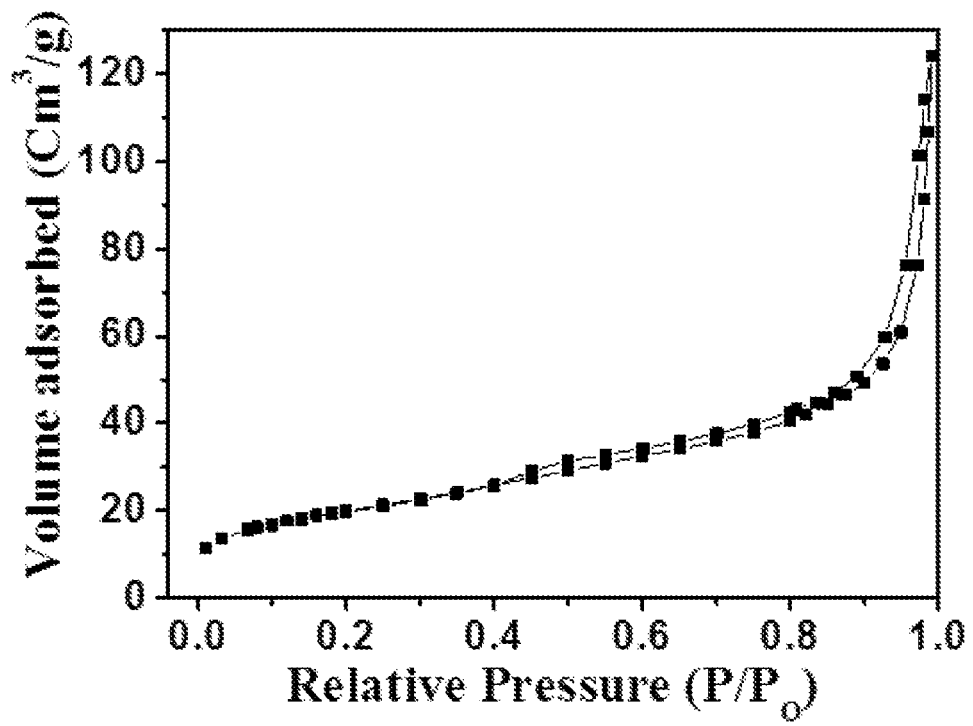
FIG. 7 shows N$_2$ adsorption-desorption isotherms of TaVO$_5$ nanorods according to the invention.

FIG. 3 shows an x-ray diffraction (XRD) pattern of TaVO$_5$ nanorods preparable by the method in Example 1, while FIG. 4 shows an energy-dispersive x-ray spectroscopy (EDX or EDS) pattern of the same. FIG. 5A to C show respective x-ray photoelectron spectroscopy (XPS) patterns of Ta, V, and O, in TaVO$_5$ nanorods obtainable according to the method in Example 1, while FIG. 6 shows a diffuse reflectance UV-vis (DR UV-vis) spectrum of these TaVO$_5$ nanorods. FIG. 7 shows N$_2$ adsorption-desorption isotherms of these TaVO$_5$ nanorods.

Figure 8:
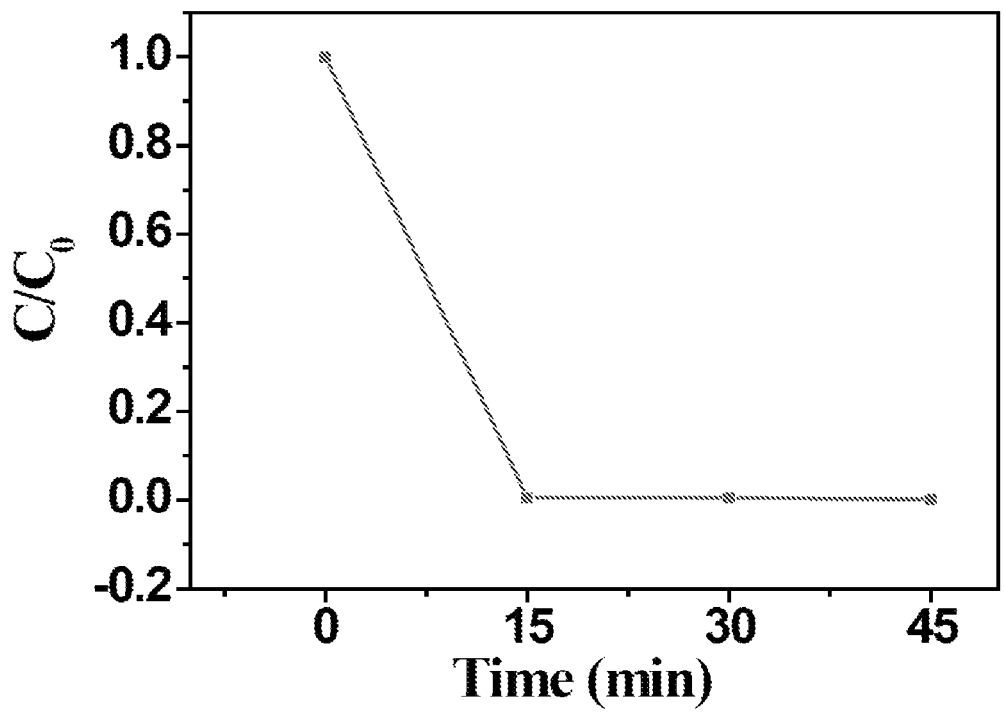
FIG. 8 shows the photocatalytic degradation of rose bengal using TaVO$_5$ nanorods according to the invention.
Figure 9:
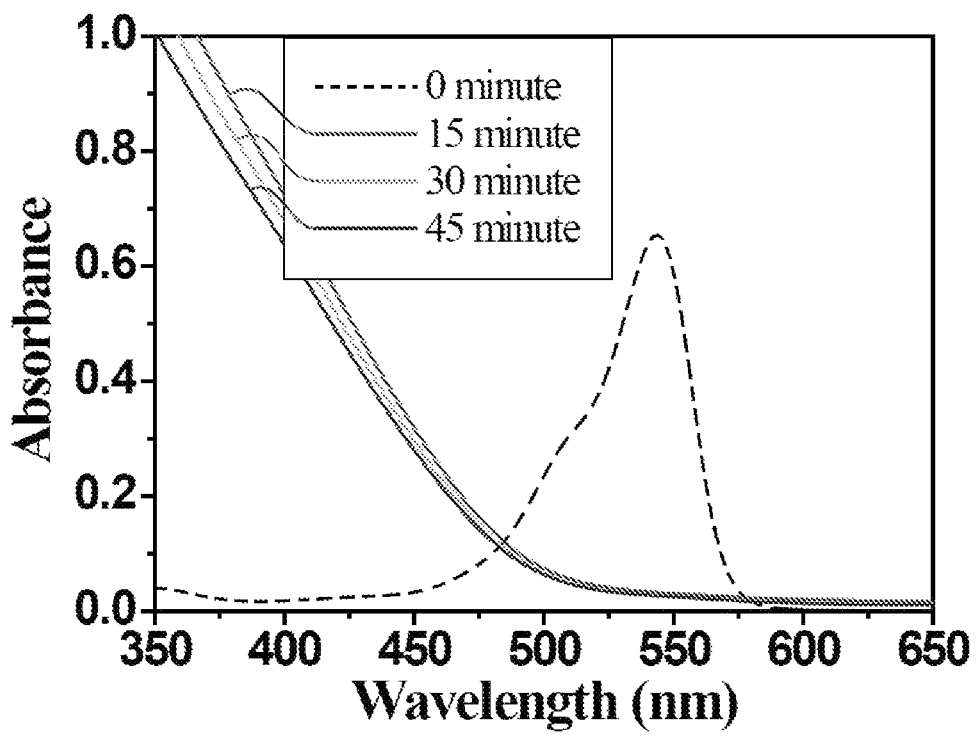
FIG. 9 shows the evolution of absorption spectra of rose bengal over time in the presence of TaVO$_5$ nanorods according to the invention.

FIG. 8 shows the photocatalytic degradation of rose bengal (4,5,6,7-tetrachloro-2',4',5',7'-tetraiodofluorescein) using TaVO$_5$ nanorods according to the invention indicating a reduction of detected concentration within 15 minutes. The photocatalytic activity of the TaVO$_5$ nanorods was evaluated through photocatalytic degradation of rose bengal under UV-visible light irradiation using Xenon lamp (300 W) as light source for 45 min. 50 mg of TaVO$_5$ was dispersed in 50 mL of aqueous solution of rose bengal (10 mg/L). In order to ensure the adsorption-desorption equilibrium between catalyst and dye, solution was stirred in the dark for 30 min and then illuminated under Xenon lamp (300 W). After a 15 minute time interval, 4 mL of the suspension was collected and centrifuged to remove TaVO$_5$ nanorod catalyst. The concentration of rose bengal was assessed using UV-Visible spectrophotometer (JASCO V-750) by measuring the absorbance at 544 nm. The degradation efficiency was calculated according to Equation 1:

$$\text{Degradation rate (\%)} = (C_0 - C)/C_0 \times 100 \quad \text{Eq. 1,}$$

wherein $C_0$ is the initial concentration of the rose bengal, and $C$ is the time-dependent concentration of rose bengal upon irradiation. FIG. 9 shows the evolution of absorption spectra of rose bengal over time in the presence of TaVO$_5$ nanorods according to the invention, wherein it can be observed that the 4,5,6,7-tetrachloro-2',4',5',7'-tetraiodofluorescein UV-Vis absorbance is diminished with time.

Numerous modifications and variations of the present invention are possible in light of the above teachings. It is therefore to be understood that within the scope of the appended claims, the invention may be practiced otherwise than as specifically described herein.

The invention claimed is:

1. A method of preparing a TaVO$_5$ nanorod, the method comprising:
    heating, at a temperature in a range of from 150 to 300° C., for a time period in a range of from 5 to 72 hours, a mixture comprising a metavanadate, an acid, and a soluble tantalum compound;
    forming TaVO5 nanorods having an average length-to-width ratio of at least 15:1,
    wherein the acid comprises at least one selected from the group consisting of formic acid, acetic acid, glycolic acid, propionic acid, butyric acid, citric acid, methanesulfonic acid, oxalic acid, malic acid, glutaric acid, maleic acid, fumaric acid, phenol, benzoic acid, salicylic acid, and tartaric acid, and/or
    wherein the acid and the metavanadate comprise H$_3$VO$_4$.

2. The method of claim 1, wherein the metavanadate comprises NH$_4$VO$_3$.

3. The method of claim 1, wherein the acid comprises formic acid.

4. The method of claim 1, wherein the soluble tantalum compound comprises a tantalum halide.

5. The method of claim 1, wherein the soluble tantalum compound comprises TaCl$_5$.

6. The method of claim 1, wherein the time period is in a range of from 12 to 36 hours, and
    wherein the temperature is in a range of from 170 to 220° C.

7. A composition, comprising:
    a plurality of nanorods,
    wherein at least 75 wt. % of a total weight of the nanorods is TaVO$_5$.

8. The composition of claim 7, wherein the plurality has an average length in a range of from 100 to 600 nm.

9. The composition of claim 7, having a bandgap in a range of from 1.5 to 3.00 eV.

10. The composition of claim 7, wherein the plurality has an average length:width ratio in a range of from 20:1 to 50:1.

11. The composition of claim 7, wherein the plurality has a BET surface area in a range of from 40 to 100 m$^2$/g.

12. The composition of claim 7, wherein the plurality has an average pore volume in a range of from 0.170 to 0.210 cm$^3$/g.

13. The composition of claim 7, wherein the plurality has an average pore size in a range of from 8 to 15 nm.

14. The composition of claim 7, comprising at least 90 wt. % of the plurality, relative to a total composition weight.

15. The composition of claim 7, consisting essentially of the plurality.

16. A nanorod, comprising:
    TaVO$_5$ in at least 75 wt. % of total nanorod weight.

17. The nanorod of claim 16, comprising at least 90 wt. % of TaVO$_5$, relative to the total nanorod weight.

18. The nanorod of claim 16, having an energy-dispersive x-ray spectroscopy pattern including a predominant peak in a range of from 4.7 to 5.1 KeV, having a first intensity, a secondary peak in a range of from 1.5 to 1.9 KeV, having a second intensity, and a tertiary peak in a range of from 0.3 to 0.6, having a third intensity, the intensities being integrals of areas under respective peaks,
    wherein the first intensity is in a range of from 3 to 6-fold that of the third intensity, and
    wherein the first intensity is in a range of from 2 to 3-fold that of the second intensity.

19. A photocatalyst, comprising the nanorod of claim 16.
20. A heterojunction, comprising the nanorod of claim 16.

* * * * *